US012637226B1

(12) United States Patent
Durocher et al.

(10) Patent No.: US 12,637,226 B1
(45) Date of Patent: May 26, 2026

(54) BIFURCATED EXHAUST DUCT FOR HYBRID AIRCRAFT POWERPLANT

(71) Applicant: Pratt & Whitney Canada Corp., Longueuil (CA)

(72) Inventors: Eric S. Durocher, Boucherville (CA); Bruno Chatelois, Boucherville (CA); Michel Labrecque, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/960,322

(22) Filed: Nov. 26, 2024

(51) Int. Cl.
| | |
|---|---|
| *B64D 33/04* | (2006.01) |
| *F02K 1/04* | (2006.01) |
| *F02K 1/40* | (2006.01) |

(52) U.S. Cl.
CPC ............... *B64D 33/04* (2013.01); *F02K 1/04* (2013.01); *F02K 1/40* (2013.01)

(58) Field of Classification Search
CPC .............. F02K 1/40; F02K 1/04; B64D 33/04
See application file for complete search history.

(56) References Cited

U.S. PATENT DOCUMENTS

| | | | |
|---|---|---|---|
| 3,541,794 A | 11/1970 | Johnston | |
| 3,693,880 A | * 9/1972 | Versaw | F02K 1/825 |
| | | | 60/770 |
| 3,806,035 A | 4/1974 | Calder | |
| 4,566,270 A | * 1/1986 | Ballard | B64D 33/04 |
| | | | 239/265.17 |

| | | |
|---|---|---|
| 5,020,318 A | 6/1991 | Vdoviak |
| 8,317,129 B1 | 11/2012 | Lawson |
| 9,003,811 B2 | 4/2015 | Barnett |
| 9,969,500 B2 | 5/2018 | Anderson |
| 10,267,263 B2 | 4/2019 | Lord |
| 10,717,539 B2 | 7/2020 | Menheere |
| 11,641,144 B2 | 5/2023 | Paziński |
| 11,746,671 B2 | 9/2023 | Grunwald |
| 11,946,415 B2 | 4/2024 | Rambo |
| 11,999,501 B2 | 6/2024 | Joo |
| 12,246,844 B1 | 3/2025 | Weaver |
| 12,529,325 B1 | 1/2026 | Lefebvre |
| 12,583,609 B2 | 3/2026 | Menheere |
| 2010/0170220 A1 | 7/2010 | Kohlenberg |
| 2010/0257837 A1 | 10/2010 | Schroder |

(Continued)

OTHER PUBLICATIONS

EP Search Report for EP Patent Application No. 25218754.7 dated Apr. 16, 2026.

*Primary Examiner* — Katheryn A Malatek
(74) *Attorney, Agent, or Firm* — Getz Balich LLC

(57) ABSTRACT

An aircraft system is provided that includes a compressor section, a combustor section, a turbine section, an exhaust duct and a flowpath. The exhaust duct includes an upstream duct section, a plurality of intermediate duct sections and a downstream duct section. A first of the intermediate duct sections is fluidly discrete from a second of the intermediate duct sections. The intermediate duct sections are fluidly coupled in parallel between the upstream duct section and the downstream duct section. The flowpath extends sequentially longitudinally through the compressor section, the combustor section, the turbine section, the upstream duct section, the intermediate duct sections and the downstream duct section from an inlet into the flowpath to an outlet from the flowpath.

15 Claims, 8 Drawing Sheets

(56)         References Cited

U.S. PATENT DOCUMENTS

| | | | |
|---|---|---|---|
| 2012/0102911 A1 | 5/2012 | Dewis | |
| 2014/0250860 A1 * | 9/2014 | Sidelkovskiy | |
| 2018/0051627 A1 * | 2/2018 | Chandler | F01D 25/30 |
| 2019/0085715 A1 | 3/2019 | Van Der Merwe | |
| 2021/0010382 A1 | 1/2021 | Davies | |
| 2021/0010383 A1 | 1/2021 | Bradley | |
| 2021/0010384 A1 | 1/2021 | Bradley | |
| 2021/0079850 A1 | 3/2021 | Davies | |
| 2021/0362843 A1 * | 11/2021 | Lamb, Jr. | B64D 33/04 |
| 2022/0302801 A1 | 9/2022 | Osama | |
| 2024/0209775 A1 * | 6/2024 | O'Connor | F02K 3/06 |
| 2024/0425192 A1 | 12/2024 | Meslioui | |

* cited by examiner

BIFURCATED EXHAUST DUCT FOR HYBRID AIRCRAFT POWERPLANT

TECHNICAL FIELD

This disclosure relates generally to an aircraft and, more particularly, to an exhaust duct for a powerplant of the aircraft.

BACKGROUND INFORMATION

A hybrid powerplant for an aircraft may include a gas turbine engine and an electric motor. The gas turbine engine and the electric motor may be operatively connected in parallel through a gearbox or inline through a shaft and/or another coupling. Various types and configurations of hybrid powerplants are known in the art. While these known hybrid powerplants have various benefits, there is still room in the art for improvement.

SUMMARY

According to an aspect of the present disclosure, an aircraft system is provided that includes a compressor section, a combustor section, a turbine section, an exhaust duct and a flowpath. The exhaust duct includes an upstream duct section, a plurality of intermediate duct sections and a downstream duct section. A first of the intermediate duct sections is fluidly discrete from a second of the intermediate duct sections. The intermediate duct sections are fluidly coupled in parallel between the upstream duct section and the downstream duct section. The flowpath extends sequentially longitudinally through the compressor section, the combustor section, the turbine section, the upstream duct section, the intermediate duct sections and the downstream duct section from an inlet into the flowpath to an outlet from the flowpath.

According to another aspect of the present disclosure, another aircraft system is provided that includes a propulsor rotor, an electric machine and a turbine engine. The electric machine is operatively coupled to the propulsor rotor. The turbine engine is operatively coupled to the propulsor rotor. The turbine engine includes a compressor section, a combustor section, a turbine section, an exhaust duct and a flowpath. The exhaust duct includes a first intermediate duct section, a second intermediate duct section and a downstream duct section. The first intermediate duct section and the second intermediate duct section are disposed to opposing lateral sides of the electric machine. The first intermediate duct section and the second intermediate duct section are fluidly coupled to the downstream duct section in parallel. The flowpath extends longitudinally through the compressor section, the combustor section, the turbine section and the exhaust duct from an inlet into the flowpath to an outlet from the flowpath.

According to still another aspect of the present disclosure, an apparatus is provided for an aircraft powerplant. This apparatus includes an exhaust duct extending longitudinally from an inlet into the exhaust duct to an outlet from the exhaust duct. The inlet into the exhaust duct has an annular cross-sectional geometry. The outlet from the exhaust duct has a non-annular cross-sectional geometry. The exhaust duct includes an upstream duct section, a first intermediate duct section, a second intermediate duct section and a downstream duct section. The upstream duct section extends longitudinally from the inlet into the exhaust duct to an upstream interface with the first intermediate duct section and the second intermediate duct section. The first intermediate duct section and the second intermediate duct section are disposed between and fluidly coupled in parallel with the upstream duct section and the downstream duct section. The downstream duct section extends longitudinally from a downstream interface with the first intermediate duct section and the second intermediate duct section to the outlet from the exhaust duct.

The first intermediate duct section may have a first intermediate section cross-sectional flow area at a midpoint longitudinally along the first intermediate duct section between the upstream duct section and the downstream duct section. The second intermediate duct section may have a second intermediate section cross-sectional flow area at a midpoint longitudinally along the second intermediate duct section between the upstream duct section and the downstream duct section. The upstream duct section may have an upstream section cross-sectional flow area that is within plus or minus ten percent of a sum of the first intermediate section cross-sectional flow area and the second intermediate section cross-sectional flow area. In addition or alternatively, the downstream duct section may have a downstream section cross-sectional flow area that is within plus or minus ten percent of the sum of the first intermediate section cross-sectional flow area and the second intermediate section cross-sectional flow area.

The first intermediate duct section may be laterally spaced apart from the second intermediate duct section by an air gap. The first intermediate duct section may have a first intermediate section cross-sectional flow area that remains uniform as the first intermediate duct section extends longitudinally from the upstream duct section to the downstream duct section. The second intermediate duct section may have a second intermediate section cross-sectional flow area that remains uniform as the second intermediate duct section extends longitudinally from the upstream duct section to the downstream duct section.

The upstream duct section may have an annular cross-sectional geometry at least at an inlet into the exhaust duct.

The downstream duct section may have a non-annular cross-sectional geometry.

Each of the intermediate duct sections may have a non-annular cross-sectional geometry.

A centerline of the downstream duct section may be laterally aligned with a centerline of the upstream duct section.

A centerline of the downstream duct section may be parallel with a centerline of the upstream duct section in a horizontal reference plane. In addition or alternatively, the centerline of the downstream duct section may be angularly offset from the centerline of the upstream duct section in a vertical reference plane.

The exhaust duct may be configured to direct combustion products out of the downstream duct section, through the outlet from the flowpath, along a vertically downward and aft extending trajectory.

Each of the intermediate duct sections may have an intermediate section cross-sectional flow area at a midpoint longitudinally between the upstream duct section and the downstream duct section. The upstream duct section may have an upstream section cross-sectional flow area that is within five percent of a sum of the intermediate section cross-sectional flow area of each of the plurality of intermediate duct sections.

Each of the intermediate duct sections may have an intermediate section cross-sectional flow area at a midpoint longitudinally between the upstream duct section and the downstream duct section. The downstream duct section may have a downstream section cross-sectional flow area that is within five percent of a sum of the intermediate section cross-sectional flow area of each of the plurality of intermediate duct sections.

The upstream duct section may have an upstream section cross-sectional flow area. The downstream duct section may have a downstream section cross-sectional flow area that is within five percent of the upstream section cross-sectional flow area.

The downstream duct section may have a downstream section cross-sectional flow area. The downstream section cross-sectional flow area may remain uniform as at least a portion of the downstream duct section extends longitudinally towards the outlet from the flowpath.

The downstream duct section may have a downstream section cross-sectional flow area. The downstream section cross-sectional flow area may decrease as at least a portion of the downstream duct section extends longitudinally towards the outlet from the flowpath.

Each of the intermediate duct sections may have a lateral width. The first of the intermediate duct sections may be separated from the second of the intermediate duct sections by a lateral distance that is greater than the lateral width.

The aircraft system may also include an electric machine aligned laterally between the first of the intermediate duct sections and the second of the intermediate duct sections.

The aircraft system may also include a propulsor rotor and a turbine engine. The turbine engine may be operatively coupled to and configured to drive rotation of the propulsor rotor. The turbine engine may include the compressor section, the combustor section, the turbine section and the exhaust duct. The electric machine may be operatively coupled to and configured to further drive the rotation of the propulsor rotor.

The first of the intermediate duct sections may be laterally spaced from the electric machine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
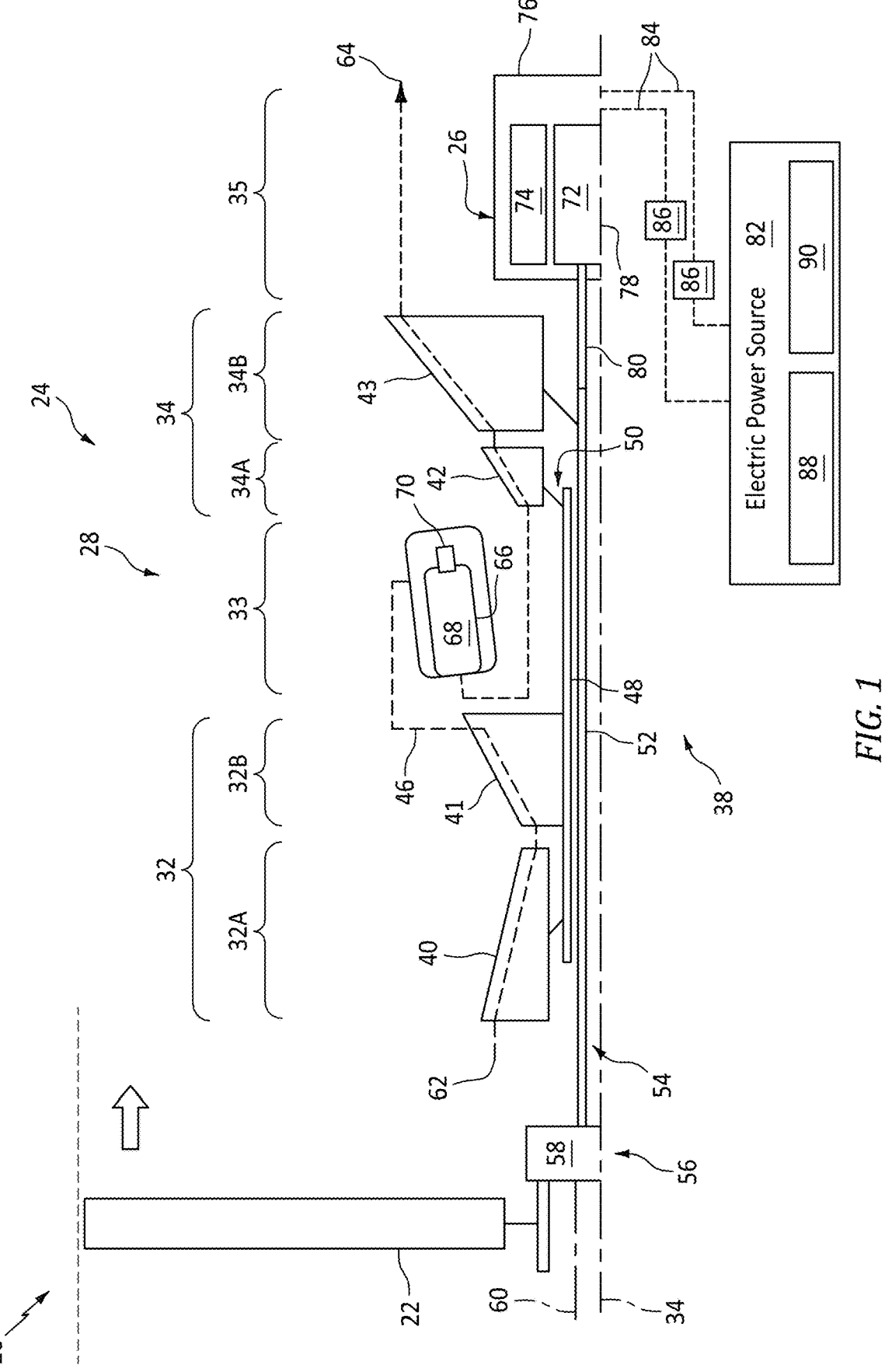
FIG. 1 is a partial schematic illustration of an aircraft system.

FIG. 1 illustrates a system 20 for an aircraft. The aircraft may be an airplane, a drone (e.g., an unmanned aerial vehicle (UAV)) or any other manned or unmanned aerial vehicle or system. This aircraft system 20 is configured as, or otherwise included as part of, a propulsion system for the aircraft. The aircraft system 20 may also be configured as, or otherwise included as part of, an electrical power system for the aircraft. The aircraft system 20 of FIG. 1, for example, includes a bladed propulsor rotor 22 and a hybrid aircraft powerplant 24 operatively coupled to the propulsor rotor 22. The aircraft powerplant 24 includes an electric machine 26 and a gas turbine engine 28.

The propulsor rotor 22 may be an open propulsor rotor (e.g., an un-ducted propulsor rotor), a ducted propulsor rotor or any other type of air moving rotor. For example, where the aircraft system 20 is a turboprop propulsion system, the open propulsor rotor may be a propeller rotor. Where the aircraft system 20 is a turbofan propulsion system, the ducted propulsor rotor may be a fan rotor. The present disclosure, however, is not limited to the foregoing exemplary propulsor rotors nor to the foregoing exemplary aircraft propulsion systems. The aircraft system 20, for example, may alternatively be configured as a turbojet propulsion system, a propfan propulsion system, a pusher fan propulsion system or any other type of aircraft propulsion system with one or more propulsor rotors. However, for ease of description, the aircraft system 20 may be described below as the turboprop propulsion system, and the propulsor rotor 22 may be described below as the propeller rotor.

The turbine engine 28 extends axially along an axis 30 from a forward, upstream end of the turbine engine 28 to an aft, downstream end of the turbine engine 28. Briefly, this engine axis 30 may be a centerline axis of the turbine engine 28 and/or its members. The engine axis 30 may also be a rotational axis of one or more members of the turbine engine 28. The turbine engine 28 of FIG. 1 includes a compressor section 32, a combustor section 33, a turbine section 34 and an exhaust section 35. The compressor section 32 of FIG. 1 includes a low pressure compressor (LPC) section 32A and a high pressure compressor (HPC) section 32B. The turbine section 34 of FIG. 1 includes a high pressure turbine (HPT) section 34A and a low pressure turbine (LPT) section 34B. Here, at least (or only) the LPC section 32A, the HPC section 32B, the combustor section 33, the HPT section 34A and the LPT section 34B collectively form a core 38 of the turbine engine 28.

The LPC section 32A includes a low pressure compressor (LPC) rotor 40. The HPC section 32B includes a high pressure compressor (HPC) rotor 41. The HPT section 34A includes a high pressure turbine (HPT) rotor 42. The LPT section 34B includes a low pressure turbine (LPT) rotor 43; e.g., a power turbine (PT) rotor in FIG. 1. The LPC rotor 40, the HPC rotor 41, the HPT rotor 42 and the LPT rotor 43 each include a rotor base (e.g., a disk or a hub) and a plurality of rotor blades (e.g., airfoils, rotor vanes, etc.). The rotor blades are arranged and may be equispaced circumferentially around the respective rotor base in one or more arrays. With this arrangement, the rotor blades may be arranged into one or more stages longitudinally along an (e.g., annular) internal flowpath 46 of the turbine engine 28. Each of the rotor blades is connected to the respective rotor base. Each of the rotor blades projects radially (e.g., span-wise) out from the respective rotor base into the engine flowpath 46 and to a distal tip of the respective rotor blade.

The LPC rotor 40 and the HPC rotor 41 are coupled to and rotatable with the HPT rotor 42. The LPC rotor 40 and HPC rotor 41 of FIG. 1, for example, are connected to the HPT rotor 42 by a high speed shaft 48. At least (or only) the LPC rotor 40, the HPC rotor 41, the HPT rotor 42 and the high speed shaft 48 collectively form a high speed rotating structure 50; e.g., a high speed spool of the turbine engine 28 and its engine core 38. This high speed rotating structure 50 of FIG. 1 is rotatable about the engine axis 30.

The LPT rotor 43 of FIG. 1 is connected to a low speed shaft 52. At least (or only) the LPT rotor 43 and the low speed shaft 52 collectively form a low speed rotating struc-ture 54; e.g., a low speed spool of the turbine engine 28 and its engine core 38. This low speed rotating structure 54 is further coupled to the propulsor rotor 22 (e.g., the propeller rotor) through a drivetrain 56. This drivetrain 56 may be configured as a geared drivetrain, where an offset geartrain 58 (e.g., a transmission, a speed change device, an epicyclic geartrain, etc.) is disposed between and operatively couples the propulsor rotor 22 to the low speed rotating structure 54 and its LPT rotor 43. With this arrangement, the propulsor rotor 22 may rotate at a different (e.g., slower) rotational speed than the low speed rotating structure 54 and its LPT rotor 43. However, the drivetrain 56 may alternatively be configured as a direct-drive drivetrain, where the geartrain 58 is omitted. With such an arrangement, the propulsor rotor 22 rotates at a common (the same) rotational speed as the low speed rotating structure 54 and its LPT rotor 43. The low speed rotating structure 54 of FIG. 1 is rotatable about the engine axis 30, whereas the propulsor rotor 22 of FIG. 1 is rotatable about a propulsor axis 60 which is (e.g., laterally) offset from the engine axis 30. The present disclosure, however, is not limited to such an exemplary arrangement. For example, the propulsor rotor 22 may alternatively be rotatable about the engine axis 30.

The engine flowpath 46 (e.g., a core flowpath) extends longitudinally within the turbine engine 28 from an airflow inlet 62 into the engine flowpath 46 to a combustion prod-ucts outlet 64 from the engine flowpath 46. The engine flowpath 46 of FIG. 1, for example, extends sequentially longitudinally through the LPC section 32A, the HPC sec-tion 32B, the combustor section 33, the HPT section 34A, the LPT section 34B and the exhaust section 35, from the flowpath inlet 62 to the flowpath outlet 64. With this arrangement, the engine flowpath 46 extends sequentially longitudinally across the LPC rotor 40, the HPC rotor 41, a (e.g., annular) combustor 66 within the combustor section 33, the HPT rotor 42 and the LPT rotor 43 between the flowpath inlet 62 and the flowpath outlet 64.

During operation of the turbine engine 28, ambient air may be directed across the propulsor rotor 22 (e.g., the propeller rotor) and into the engine core 38 through the flowpath inlet 62. This air entering the engine flowpath 46 may be referred to as "core air". The core air is compressed by the LPC rotor 40 and the HPC rotor 41 and directed into a (e.g., annular) combustion chamber 68 within the com-bustor 66. Fuel is introduced into the engine flowpath 46 by one or more fuel injectors 70. This fuel is mixed with the compressed core air to provide a fuel-air mixture. The fuel-air mixture is ignited and combustion products thereof flow through and sequentially drive rotation of the HPT rotor 42 and the LPT rotor 43. The rotation of the HPT rotor 42 drives rotation of the LPC rotor 40 and the HPC rotor 41 and, thus, the compression of the air received from the flowpath inlet 62. The rotation of the LPT rotor 43 drives rotation of the propulsor rotor 22. The rotation of the propulsor rotor 22 propels some of the airflow thereacross (e.g., the air not entering the engine core 38) outside of the engine core 38 and, more generally, outside of the aircraft system 20 of FIG. 1 to provide forward aircraft thrust.

While the turbine engine 28 is described above with a particular two rotating structure arrangement, the present disclosure is not limited thereto. For example, the LPC rotor 40 may alternatively be configured as a part of the low speed rotating structure 54. In another example, the turbine engine 28 may also include another rotating structure; e.g., an intermediate speed spool of the turbine engine 28. In still another example, where the low speed rotating structure 54 is configured with one or more of the compressor rotors 40 and/or 41, the high speed rotating structure 50 may be omitted to provide the turbine engine 28 with a single rotating structure arrangement.

Referring still to FIG. 1, the electric machine 26 includes an electric machine rotor 72, an electric machine stator 74 and an electric machine housing 76. The machine rotor 72 is rotatable about a rotational axis 78 of the machine rotor 72, which machine axis 78 may (or may not) be parallel (e.g., coaxial) with the engine axis 30. The machine rotor 72 is coupled to and rotatable with the low speed rotating struc-ture 54 and its members 43 and 52. The machine rotor 72 of FIG. 1, for example, is connected to the low speed rotating structure 54 and its low speed shaft 52 through an inter-machine-engine coupling 80; e.g., a driveshaft. The machine stator 74 is radially outboard of and circumscribes the machine rotor 72. With this arrangement, the electric machine 26 is configured as a radial flux electric machine. The electric machine 26 of the present disclosure, however, is not limited to such an exemplary rotor-stator configuration nor to radial flux arrangements. The machine rotor 72, for example, may alternatively be radially outboard of and circumscribe the machine stator 74. In another example, the machine rotor 72 may be axially next to the machine stator 74 configuring the electric machine 26 as an axial flux electric machine. The machine rotor 72 and the machine stator 74 of FIG. 1 are at least partially or completely housed within the machine housing 76.

The electric machine 26 may be configurable as an electric motor and/or an electric generator. For example, during a motor mode of operation, the electric machine 26 may operate as the electric motor to convert electricity received from an electrical power source 82 into mechanical power. The machine stator 74, for example, may generate an electromagnetic field with the machine rotor 72 using the electricity. The electromagnetic field may drive rotation of the machine rotor 72. The machine rotor 72 may further drive the rotation of the propulsor rotor 22 by boosting available mechanical power to the low speed rotating struc-ture 54; e.g., while the turbine engine 28 is operational. The machine rotor 72 may also or alternatively drive rotation of the low speed rotating structure 54; e.g., for turbine engine startup. During a generator mode of operation, the electric machine 26 may operate as the electric generator to convert mechanical power received from, for example, the low speed rotating structure 54 into electricity. The low speed rotating structure 54, for example, may drive rotation of the machine rotor 72 through the inter-machine-engine coupling 80. The rotation of the machine rotor 72 may generate an electromagnetic field with the machine stator 74, and the machine stator 74 may convert energy from the electromag-netic field into the electricity. The electric machine 26 may then provide this electricity to the power source 82 for further use. Of course, in other embodiments, the electric machine 26 may alternatively be configured as a dedicated electric motor (e.g., without the electric generator functionality) or a dedicated electric generator (e.g., without the electric motor functionality).

The power source 82 is electrically coupled with the electric machine 26 through electrical circuitry; e.g., an electrical power bus. This electrical circuitry may include one or more electrical leads 84 (e.g., high voltage lines) and one or more electrical devices 86 for conditioning, metering, regulating and/or otherwise controlling electrical power transfer between the electric machine 26 and the power source 82. Examples of the electrical devices 86 include, but are not limited to, switches (e.g., contactors), current regulators, converters and buffers.

The power source 82 may be configured to store electricity received from the electric machine 26 during, for example, the generator operating mode. The power source 82 may also or alternatively be configured to provide electricity to the electric machine 26 during, for example, the motor operating mode. The power source 82, for example, may be configured as or otherwise include one or more electricity storage devices 88 such as batteries, supercapacitors, or the like. The power source 82 may also or alternatively include another electric generator 90 onboard the aircraft such as an electric generator for a companion propulsion system, an electric generator for an auxiliary power unit (APU), a fuel cell system, or the like.

Figure 2:
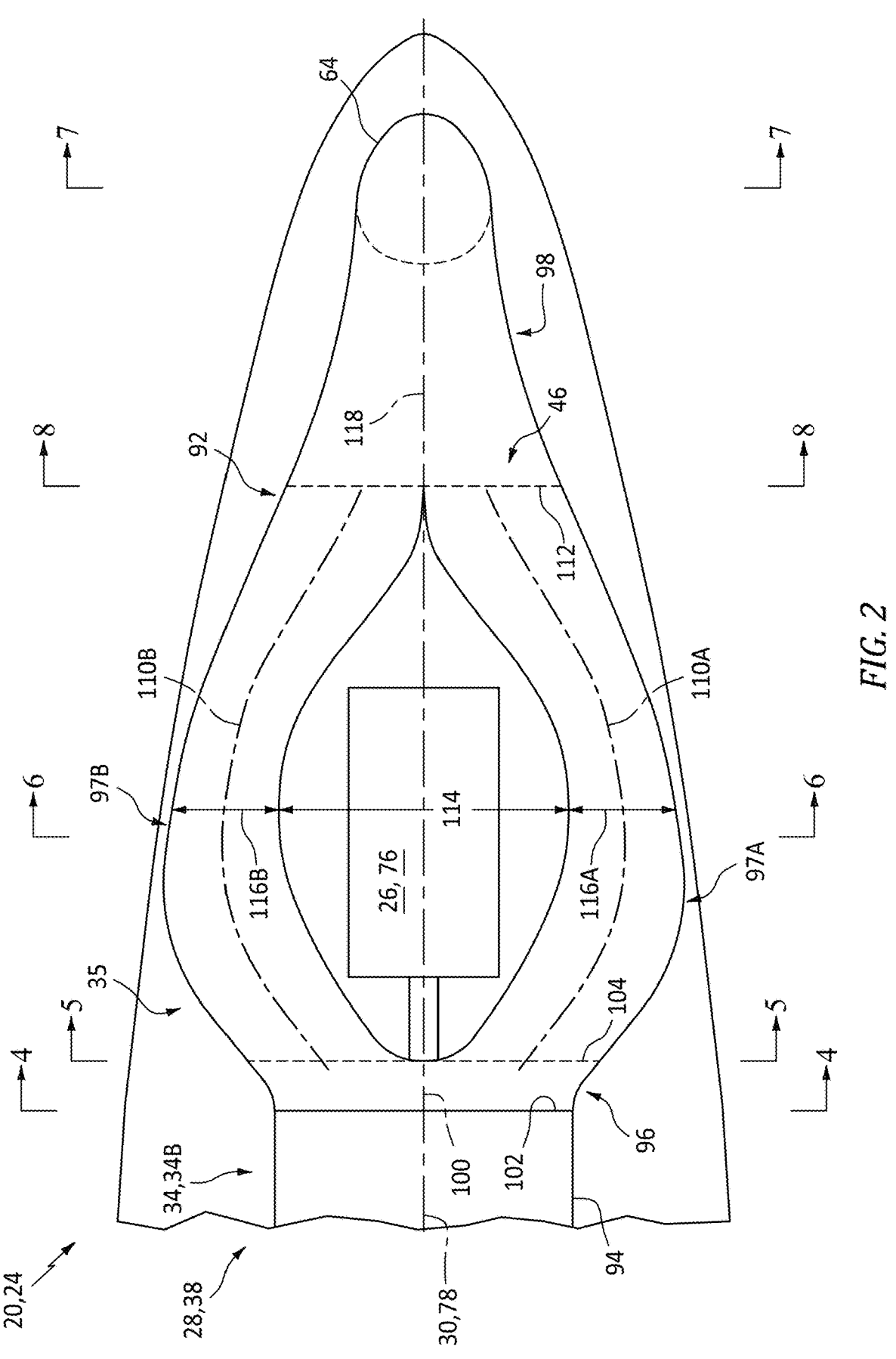
FIG. 2 is a schematic plan view illustration of a portion of the aircraft system at an exhaust section.
Figure 3:
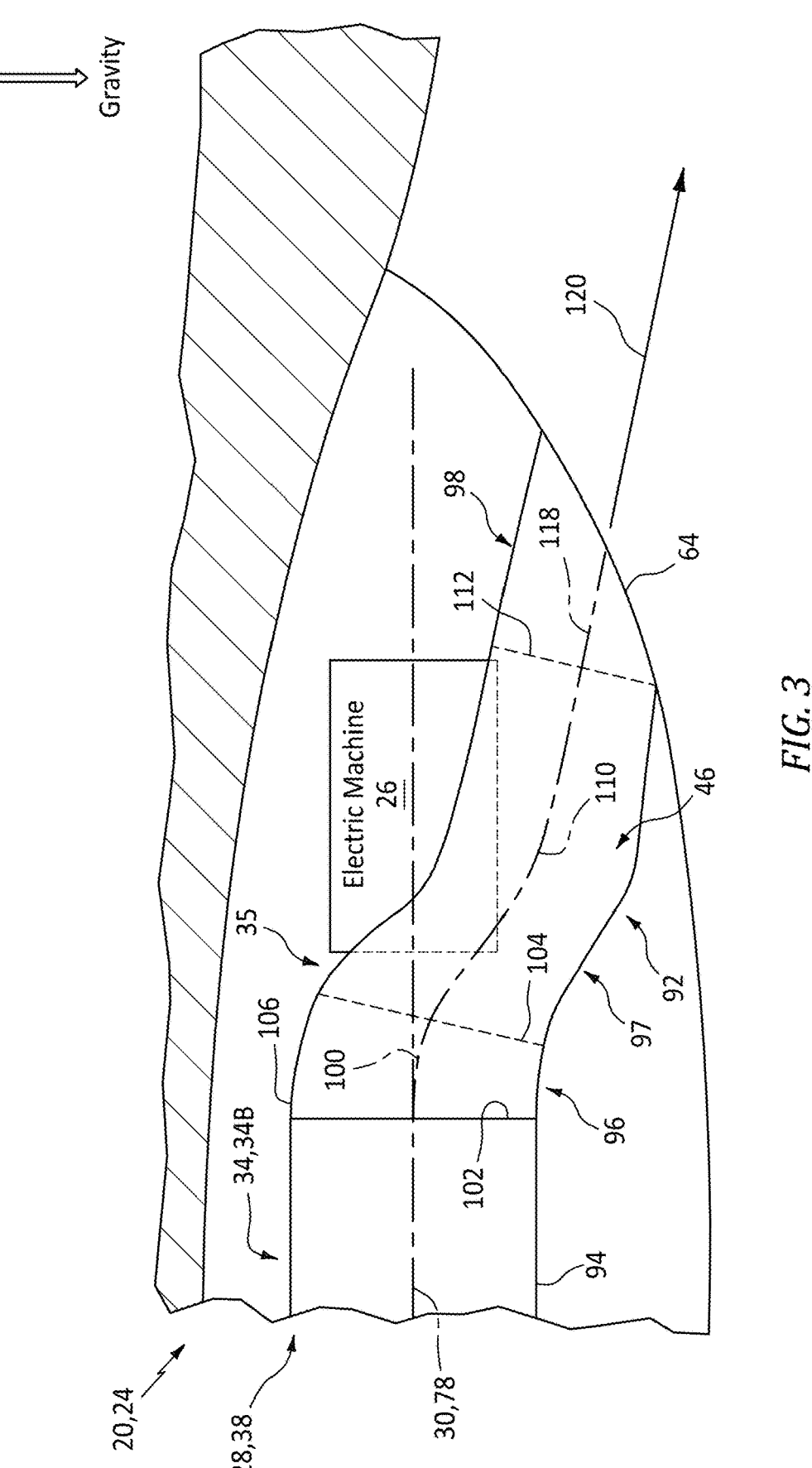
FIG. 3 is a schematic sectional illustration of a portion of the aircraft system at the exhaust section.

Referring to FIGS. 2 and 3, the exhaust section 35 includes a partially bifurcated exhaust duct 92. This exhaust duct 92 is mounted to an engine case 94 that at least partially houses the engine core 38. Examples of the engine case 94 include, but are not limited to, a turbine case, a turbine exhaust case (TEC), or the like. The exhaust duct 92 is configured to form a section of the engine flowpath 46 which extends longitudinally from (or about) an outlet of the turbine section 34 to the flowpath outlet 64. The exhaust duct 92 is also configured to facilitate packaging the electric machine 26 (and/or other equipment, accessories, etc.) axially aft/downstream of the turbine section 34 along the engine axis 30 while, for example, also exhausting of the combustion products out of the turbine engine 28 in a manner that contributes to the forward aircraft thrust. The exhaust duct 92 of FIG. 2, for example, includes an upstream duct section 96, a plurality of intermediate duct sections 97A and 97B (generally referred to as "97") and a downstream duct section 98.

Figures 4, 5:
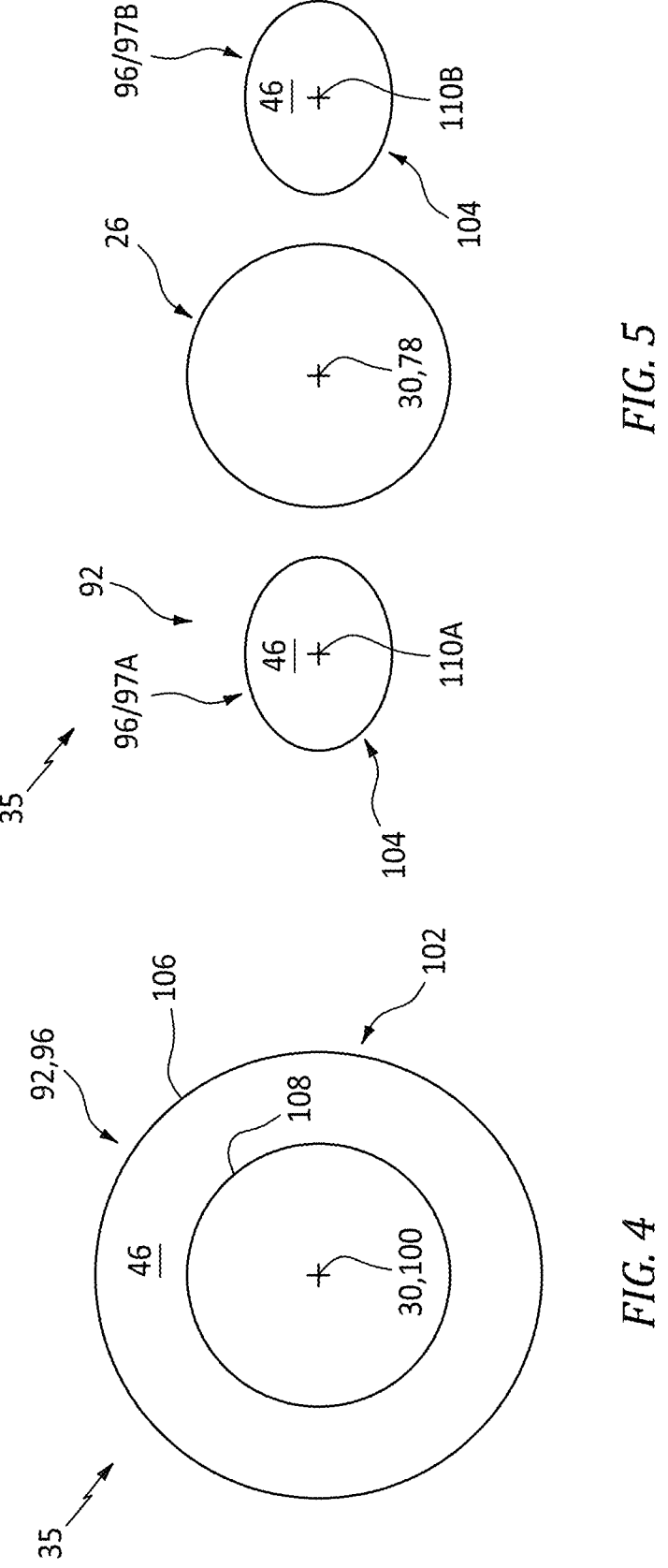
FIG. 4 is a cross-sectional illustration of an exhaust duct taken along line 4-4 in FIG. 2.
FIG. 5 is a cross-sectional illustration of the exhaust duct taken along line 5-5 in FIG. 2.

The upstream duct section 96 of FIG. 2 extends longitudinally along a longitudinal centerline 100 of the upstream duct section 96 from (a) a combustion products inlet 102 into the exhaust duct 92 and its upstream duct section 96 to (b) an interface 104 between the upstream duct section 96 and the intermediate duct sections 97. Referring to FIG. 4, at the duct inlet 102, the upstream duct section 96 has a single passage configuration with an annular cross-sectional geometry. The upstream duct section 96 of FIG. 4, for example, includes an outer duct wall 106 and an exhaust cone 108. The outer duct wall 106 is disposed radially outboard of the exhaust cone 108. The outer duct wall 106 extends longitudinally along (e.g., longitudinally overlaps) and extends circumferentially about (e.g., circumscribes) the exhaust cone 108. The outer duct wall 106 forms a radial outer peripheral boundary of the engine flowpath 46 within the upstream duct section 96. The exhaust cone 108 forms a radial inner peripheral boundary of the engine flowpath 46 at least along an upstream portion of the engine flowpath 46 within the upstream duct section 96. Referring to FIG. 5, at the upstream inter-duct interface 104, the upstream duct section 96 splits into a dual passage configuration, where each of the dual passages has a solid (e.g., non-annular) cross-sectional geometry. The upstream duct section 96 of FIG. 2 is configured to provide a smooth fluid-dynamic transition that splits the engine flowpath 46 from its single annular passage at the duct inlet 102 to its set of fluidly discrete dual passages at the upstream inter-duct interface 104.

Figure 6:
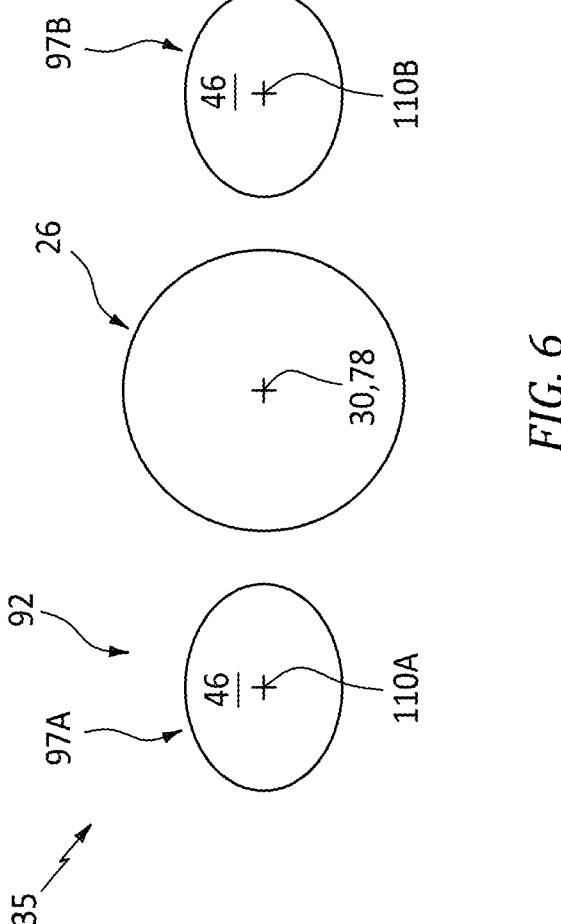
FIG. 6 is a cross-sectional illustration of the exhaust duct taken along line 6-6 in FIG. 2.

The intermediate duct sections 97 are fluidly discrete sections of the exhaust duct 92. The intermediate duct sections 97 of FIG. 2, for example, are fluidly separate from one another along longitudinal lengths thereof. Each of these intermediate duct sections 97 extends longitudinal along a longitudinal centerline 110A, 110B (generally referred to as "110") of the respective intermediate duct section 97 from (a) the upstream duct section 96 at the upstream inter-duct interface 104 to (b) the downstream duct section 98 at an interface 112 between the downstream duct section 98 and the intermediate duct sections 97. The intermediate duct sections 97 are fluidly coupled in parallel with and between the upstream duct section 96 and the downstream duct section 98. Referring to FIG. 6, each of the intermediate duct sections 97 has a solid (e.g., non-annular) cross-sectional geometry. In FIG. 6, the intermediate duct section cross-sectional geometry is rounded (e.g., circular, oval, elliptical, etc.). The present disclosure, however, is not limited to such an exemplary cross-sectional geometry shape.

Referring to FIG. 2, the intermediate duct sections 97 are laterally separated from one another by a lateral distance 114 when viewed, for example, in a horizontal reference plane; e.g., the plane of FIG. 2. Briefly, the horizontal reference plane may be a plane which is perpendicular to gravity when, for example, the aircraft is on-ground and/or in level flight. This lateral distance 114 of FIG. 2 is sized larger than a lateral width 116A, 116B (generally referred to as "116") of each intermediate duct section 97A, 97B at, for example, an intermediate location (e.g., a midpoint) longitudinally along the respective intermediate duct section centerline 110A, 110B. With this arrangement, the intermediate duct sections 97 are spaced apart to provide room for the electric machine 26. Moreover, each intermediate duct section 97 is spaced laterally apart from the electric machine 26 so as to allow airflow between the respective intermediate duct section 97 and the electric machine 26. Here, the electric machine 26 of FIG. 2 is also located longitudinally between the upstream duct section 96 and the downstream duct section 98.

Figures 7, 8:
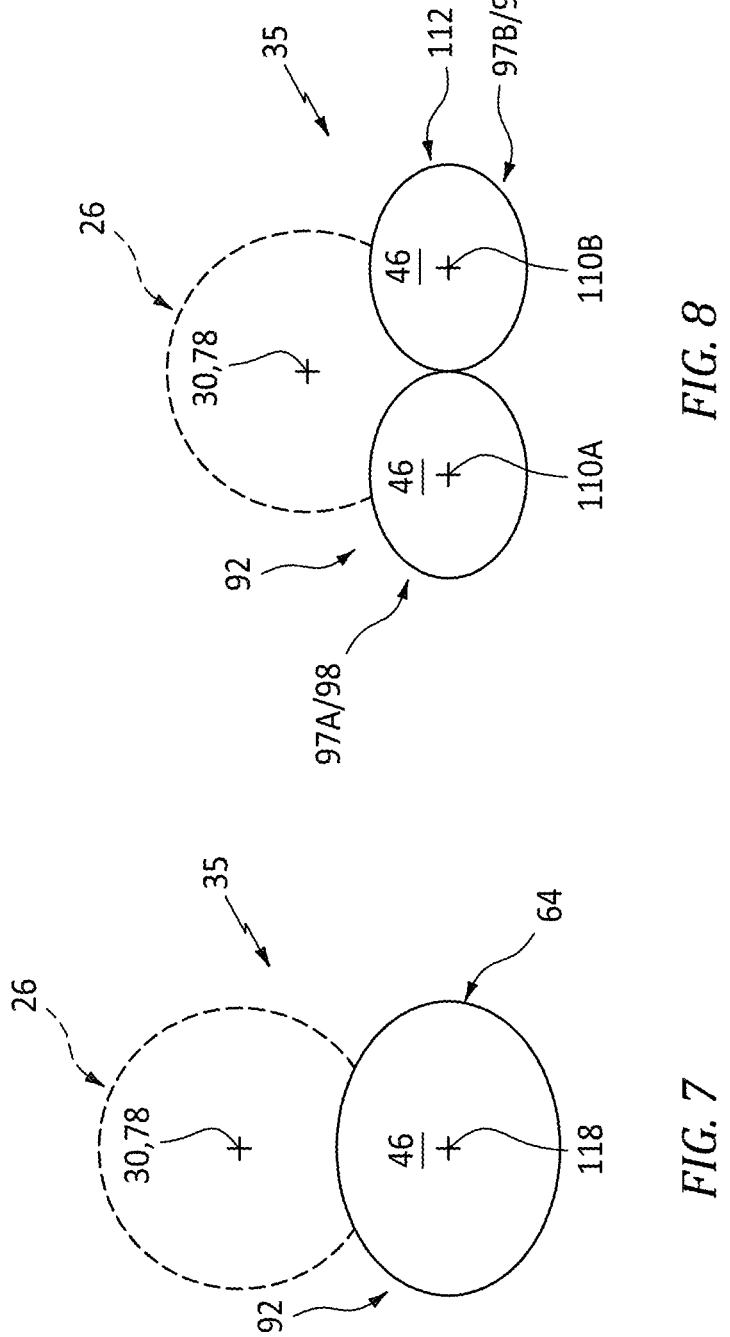
FIG. 7 is a cross-sectional illustration of the exhaust duct taken along line 7-7 in FIG. 2.
FIG. 8 is a cross-sectional illustration of the exhaust duct taken along line 8-8 in FIG. 2.

The downstream duct section 98 of FIG. 2 extends longitudinally along a longitudinal centerline 118 of the downstream duct section 98 from (a) the downstream inter-duct interface 112 to (b) the flowpath outlet 64. Referring to FIG. 7, at the flowpath outlet 64, the downstream duct section 98 has a solid (e.g., non-annular) cross-sectional geometry. In FIG. 7, the downstream duct section cross-sectional geometry is rounded (e.g., circular, oval, elliptical, etc.). The present disclosure, however, is not limited to such an exemplary cross-sectional geometry shape. Referring to FIG. 8, at the downstream inter-duct interface 112, the downstream duct section 98 splits into a dual passage configuration, where each of the dual passages has a solid (e.g., non-annular) cross-sectional geometry. The downstream duct section 98 of FIG. 2 is configured to provide a smooth fluid-dynamic transition that re-combines the engine flowpath 46 from its set of fluidly discrete dual passages at the downstream inter-duct interface 112 to its single annular passage at the flowpath outlet 64.

With the foregoing arrangement, the exhaust duct 92 splits apart, extends around the electric machine 26 and comes back together before reaching the flowpath outlet 64. The centerline 118 of the downstream duct section 98 may be aligned with the centerline 100 of the upstream duct section 96 and/or the engine axis 30 when viewed, for example, in the horizontal reference plane. In addition, at least at the flowpath outlet 64 of FIG. 3, the centerline 118 of the downstream duct section 98 may have at least major axial component when viewed, for example, in a vertical reference plane; e.g., the plane of FIG. 3. Briefly, the vertical reference plane may be a plane which is parallel to gravity and the engine axis 30 when, for example, the aircraft is on-ground and/or in level flight. The exhaust duct 92 and its downstream duct section 98 may thereby exhaust the combustion products from the turbine engine 28 along a substantially axial aft trajectory 120, laterally inline with the turbine engine 28 and the propulsor rotor 22. The combustion products exhausted from the turbine engine 28 and its exhaust duct 92 may thereby contribute to the forward aircraft thrust in a similar manner as if, for example, the electric machine 26 was not positioned axially aft of the engine core 38.

In some embodiments, the centerline 118 of the downstream duct section 98 may be angularly offset (e.g., in a vertical downward direction) from the centerline 100 of the upstream duct section 96 and/or the engine axis 30 when viewed, for example, in the vertical reference plane. The exhausted combustion products trajectory 120 may thereby also have a (e.g., slight) vertically downward component.

Figure 9:
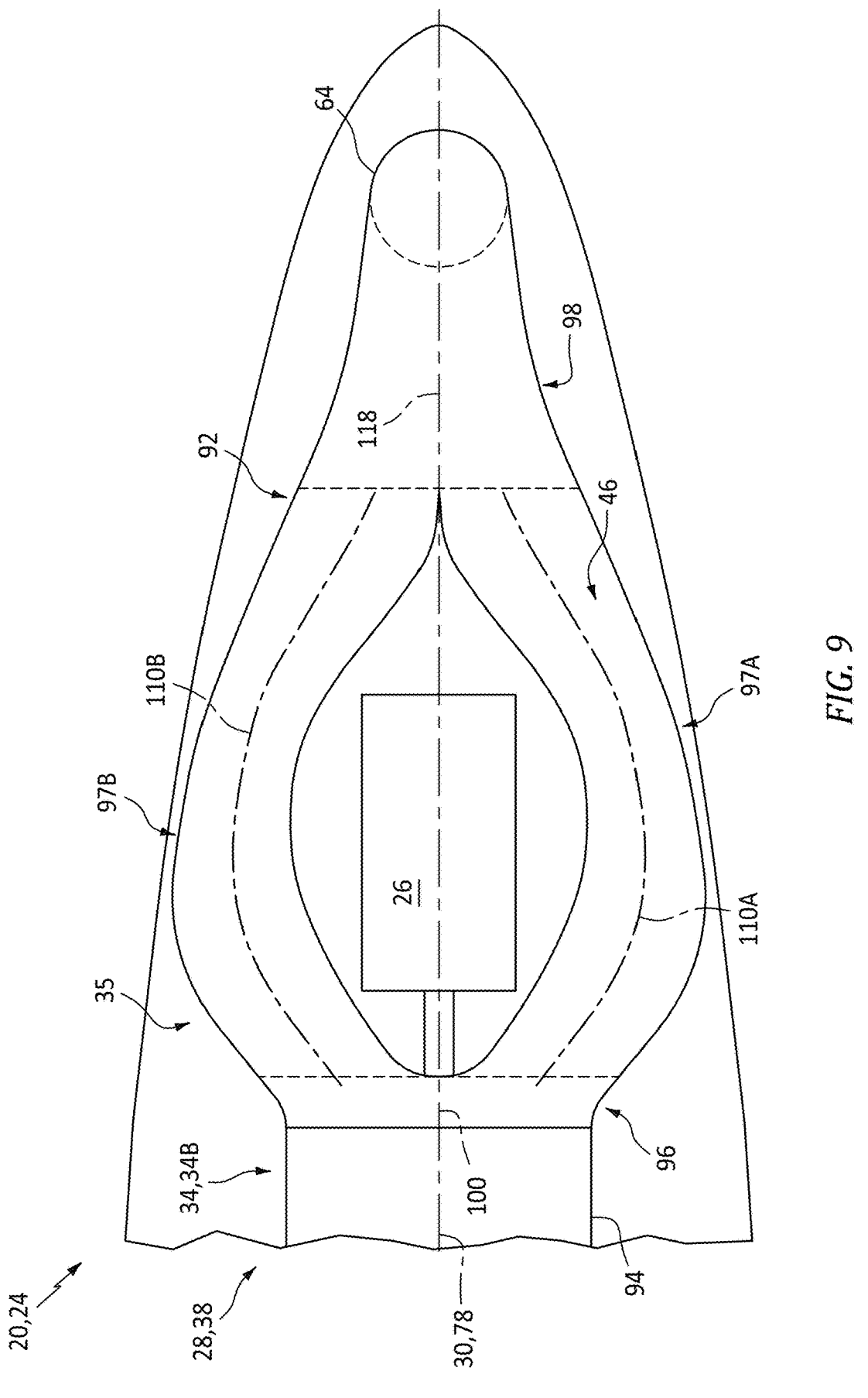
FIG. 9 is a schematic plan view illustration of a portion of the aircraft system at the exhaust section with another arrangement.

In some embodiments, referring to FIG. 2, the exhaust duct 92 may be configured such that a cross-sectional flow area of the engine flowpath 46 longitudinally from (or about) the duct inlet 102 to (or about) the flowpath outlet 64 may be completely or substantially (e.g., within five percent (+/−5%) or ten percent (+/−10%)) uniform. With such an arrangement, an upstream section cross-sectional flow area of the downstream duct section 98 may be completely or substantially equal to a downstream section cross-sectional flow area of the upstream duct section 96. The upstream section cross-sectional flow area may be measured at the duct inlet 102, at the upstream inter-duct interface 104, or at an intermediate location (e.g., a midpoint) longitudinally therebetween. The downstream section cross-sectional flow area may be measured at the flowpath outlet 64, at the downstream inter-duct interface 112, or at an intermediate location (e.g., a midpoint) longitudinally therebetween. In addition, a sum of an intermediate section cross-sectional flow area of the first intermediate duct section 97A and an intermediate section cross-sectional flow area of the second intermediate duct section 97B may be completely or substantially equal to the upstream section cross-sectional flow area and/or the downstream section cross-sectional flow area. The intermediate section cross-sectional flow area of each intermediate duct section 97 may be measured at an intermediate location (e.g., a midpoint) longitudinally between the upstream inter-duct interface 104 and the downstream inter-duct interface 112. In other embodiments, referring to FIG. 9, the cross-sectional flow area of the engine flowpath 46 and, more particularly, the downstream section cross-sectional flow area may decrease as the downstream duct section 98 extends longitudinally towards (e.g., to) the flowpath outlet 64.

Figure 10:
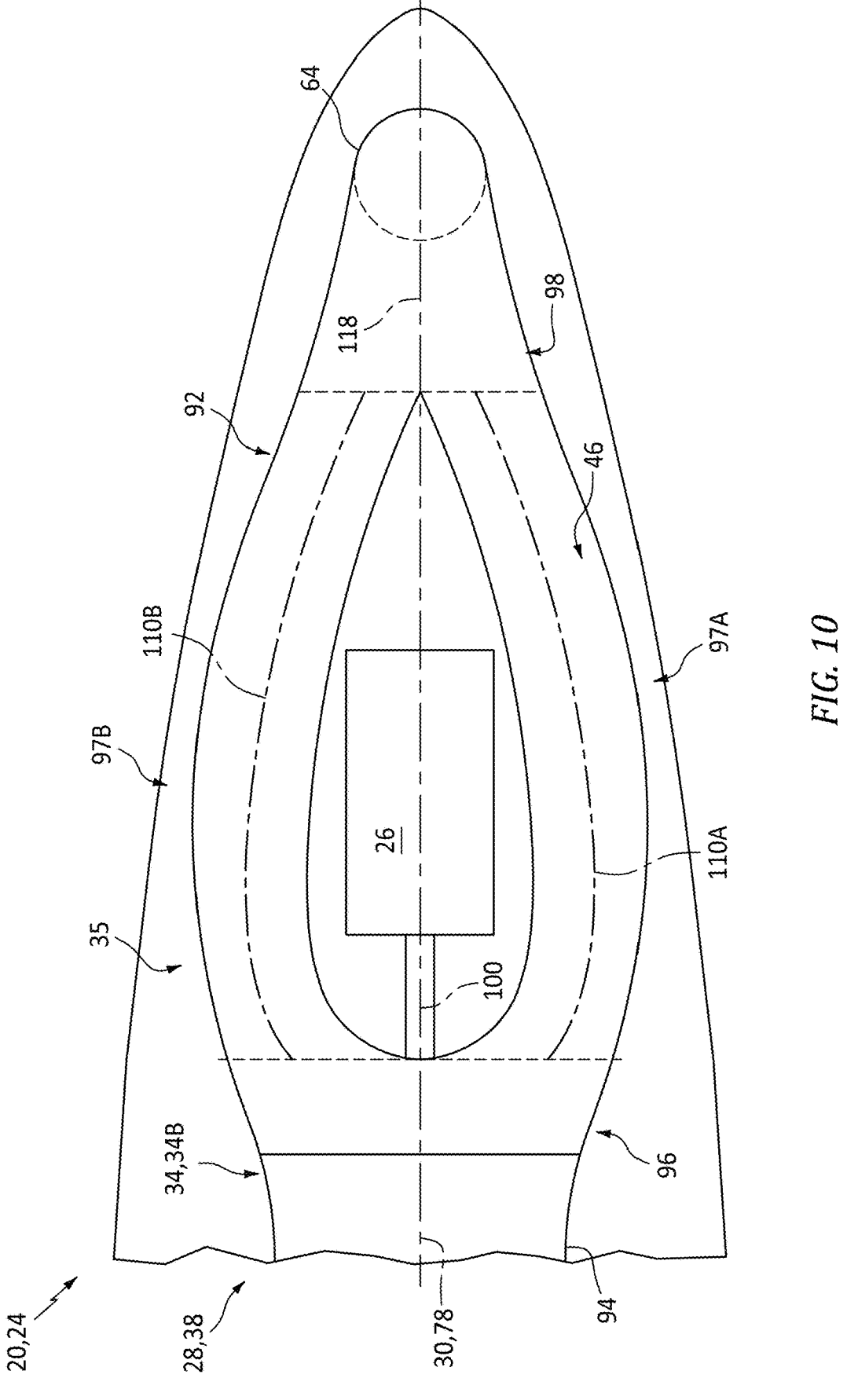
FIG. 10 is a schematic plan view illustration of a portion of the aircraft system at the exhaust section with still another arrangement.

In some embodiments, referring to FIG. 10, the exhaust duct 92 may be configured such that the engine flowpath 46 follows a smoothed out, extended trajectory around the electric machine 26. The exhaust duct 92 of FIG. 10, for example, may have a teardrop and/or airfoil plan-view geometry around the electric machine 26. Such an arrangement may reduce aerodynamic flow losses as the engine flowpath 46 splits upstream of the electric machine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system, comprising:
a compressor section;
a combustor section;
a turbine section;
an exhaust duct including an upstream duct section, a plurality of intermediate duct sections and a downstream duct section, a first of the plurality of intermediate duct sections fluidly discrete from a second of the plurality of intermediate duct sections, and the plurality of intermediate duct sections fluidly coupled in parallel between the upstream duct section and the downstream duct section; and
a flowpath extending sequentially longitudinally through the compressor section, the combustor section, the turbine section, the upstream duct section, the plurality of intermediate duct sections and the downstream duct section from an inlet into the flowpath to an outlet from the flowpath;
wherein each of the plurality of intermediate duct sections has an intermediate section cross-sectional flow area at a midpoint longitudinally between the upstream duct section and the downstream duct section; and
wherein the upstream duct section has an upstream section cross-sectional flow area that is within five percent of a sum of the intermediate section cross-sectional flow area of each of the plurality of intermediate duct sections.

2. The aircraft system of claim 1, wherein the upstream duct section has an annular cross-sectional geometry at least at an inlet into the exhaust duct.

3. The aircraft system of claim 1, wherein the downstream duct section has a non-annular cross-sectional geometry.

4. The aircraft system of claim 1, wherein each of the intermediate duct sections has a non-annular cross-sectional geometry.

5. The aircraft system of claim 1, wherein a centerline of the downstream duct section is laterally aligned with a centerline of the upstream duct section.

6. The aircraft system of claim 1, wherein at least one of
a centerline of the downstream duct section is parallel with a centerline of the upstream duct section in a horizontal reference plane; or
the centerline of the downstream duct section is angularly offset from the centerline of the upstream duct section in a vertical reference plane.

7. The aircraft system of claim 1, wherein the exhaust duct is configured to direct combustion products out of the downstream duct section, through the outlet from the flowpath, along a vertically downward and aft extending trajectory.

8. The aircraft system of claim 1, wherein the downstream duct section has a downstream section cross-sectional flow area; and the downstream section cross-sectional flow area remains uniform as at least a portion of the downstream duct section extends longitudinally towards the outlet from the flowpath.

9. The aircraft system of claim 1, wherein the downstream duct section has a downstream section cross-sectional flow area; and the downstream section cross-sectional flow area decreases as at least a portion of the downstream duct section extends longitudinally towards the outlet from the flowpath.

10. The aircraft system of claim 1, wherein each of the plurality of intermediate duct sections has a lateral width; and the first of the plurality of intermediate duct sections is separated from the second of the plurality of intermediate duct sections by a lateral distance that is greater than the lateral width.

11. The aircraft system of claim 1, further comprising an electric machine aligned laterally between the first of the plurality of intermediate duct sections and the second of the plurality of intermediate duct sections.

12. The aircraft system of claim 11, further comprising:

a propulsor rotor; and a turbine engine operatively coupled to and configured to drive rotation of the propulsor rotor, the turbine engine including the compressor section, the combustor section, the turbine section and the exhaust duct;

the electric machine operatively coupled to and configured to further drive the rotation of the propulsor rotor.

13. The aircraft system of claim 11, wherein the first of the plurality of intermediate duct sections is laterally spaced from the electric machine.

14. An aircraft system, comprising:

a compressor section;

a combustor section;

a turbine section;

an exhaust duct including an upstream duct section, a plurality of intermediate duct sections and a downstream duct section, a first of the plurality of intermediate duct sections fluidly discrete from a second of the plurality of intermediate duct sections, and the plurality of intermediate duct sections fluidly coupled in parallel between the upstream duct section and the downstream duct section; and a flowpath extending sequentially longitudinally through the compressor section, the combustor section, the turbine section, the upstream duct section, the plurality of intermediate duct sections and the downstream duct section from an inlet into the flowpath to an outlet from the flowpath;

wherein each of the plurality of intermediate duct sections has an intermediate section cross-sectional flow area at a midpoint longitudinally between the upstream duct section and the downstream duct section; and wherein the downstream duct section has a downstream section cross-sectional flow area that is within five percent of a sum of the intermediate section cross-sectional flow area of each of the plurality of intermediate duct sections.

15. An aircraft system, comprising:

a compressor section;

a combustor section;

a turbine section;

an exhaust duct including an upstream duct section, a plurality of intermediate duct sections and a downstream duct section, a first of the plurality of intermediate duct sections fluidly discrete from a second of the plurality of intermediate duct sections, and the plurality of intermediate duct sections fluidly coupled in parallel between the upstream duct section and the downstream duct section; and a flowpath extending sequentially longitudinally through the compressor section, the combustor section, the turbine section, the upstream duct section, the plurality of intermediate duct sections and the downstream duct section from an inlet into the flowpath to an outlet from the flowpath;

wherein the upstream duct section has an upstream section cross-sectional flow area; and wherein the downstream duct section has a downstream section cross-sectional flow area that is within five percent of the upstream section cross-sectional flow area.

* * * * *